United States Patent [19]

Neumann et al.

[11] 4,243,486
[45] Jan. 6, 1981

[54] METHOD OF MOUNTING FILTER ELEMENTS AND MOUNTING THEREFOR

[75] Inventors: Gerhard M. Neumann; Jochen Karelin, both of Berlin, Fed. Rep. of Germany

[73] Assignee: Delbag-Luftfilter GmbH, Berlin, Fed. Rep. of Germany

[21] Appl. No.: 837,810

[22] Filed: Sep. 29, 1977

Related U.S. Application Data

[62] Division of Ser. No. 725,006, Sep. 20, 1976, Pat. No. 4,193,844.

[51] Int. Cl.³ .............................................. G21C 19/20
[52] U.S. Cl. ..................................................... 176/37
[58] Field of Search ....................... 176/37, 38; 55/492, 55/502, 484, DIG. 9

[56] References Cited

U.S. PATENT DOCUMENTS

| | | | |
|---|---|---|---|
| 2,604,311 | 7/1952 | Summerhill | 55/492 |
| 3,243,942 | 4/1966 | Burke | 55/492 |
| 3,354,616 | 10/1967 | Lucas | 55/DIG. 9 |
| 3,556,941 | 1/1971 | Takahashi | 176/37 |
| 3,690,045 | 9/1972 | Neumann | 55/DIG. 9 |
| 3,740,934 | 6/1973 | Shuler | 55/502 |
| 3,999,969 | 12/1976 | Shuler | 55/502 |
| 4,015,751 | 4/1977 | Rollins et al. | 55/502 |
| 4,045,350 | 8/1977 | Kupf et al. | 55/492 |
| 4,058,379 | 11/1977 | Cheng | 55/492 |
| 4,124,361 | 11/1978 | Revell | 55/484 |

*Primary Examiner*—S. A. Cangialosi
*Attorney, Agent, or Firm*—Basile, Weintraub & Hanlon

[57] ABSTRACT

A process for the insertion and exchange of the filter elements for suspended matter is performed from the clean-air-side. During the insertion of a filter element, a plastic tube (which encircles the circumference of the filter element and which exceeds in its length the layer thickness of the filter element several times) is tightly connected in its middle section with the side walls, which side walls form a border around the filter element; and then the open end of the plastic tube, which faces the frame, is connected by way of a tight fit with a ring, which is actually known and which surrounds the orifice of the frame into which the filter element is inserted. The filter element is connected with the frame by means of tightening devices, and the outer free end of the tube is turned inside out and around the filter element for the purpose of unhindered air passage through the filter layer, that during the exchange of the contaminated filter element, the outer open end of the tube is heat sealed. The filter element is disconnected and removed from the frame by flipping down of the tightening devices, and the tube is heat sealed in the section between the filter element and the frame, and, that during the insertion of a new filter element, a new tube is attached by way of tight fitting to the ring of the frame, which tube is at its middle section tightly connected with the filter element, and which tube is attached to the ring of the frame in an actually known by overlapping of the heat-sealed tube rest. The tube rest is pulled onto the new tube and pulled off the ring, and the filter element is tightly connected with the frame by means of the tightening devices.

1 Claim, 22 Drawing Figures

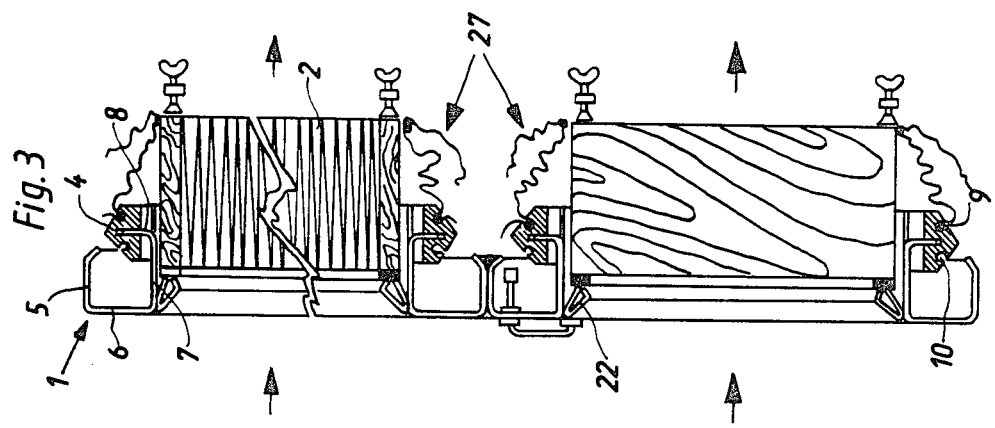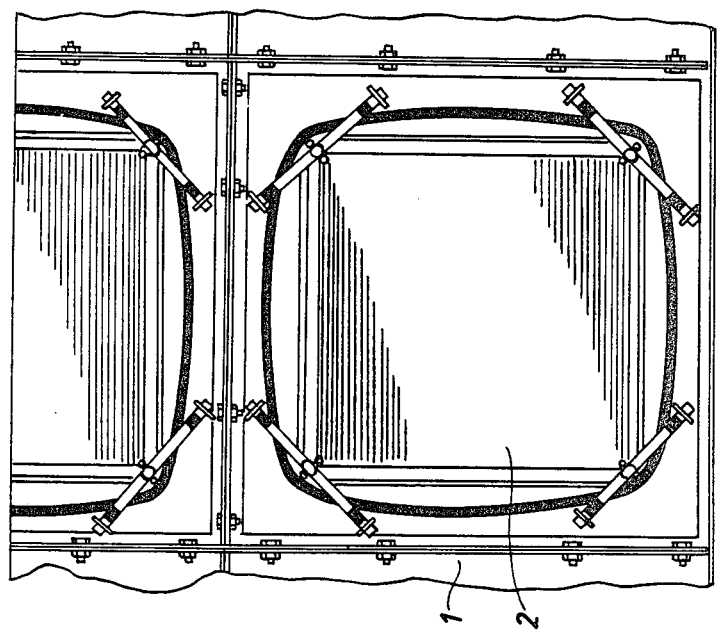

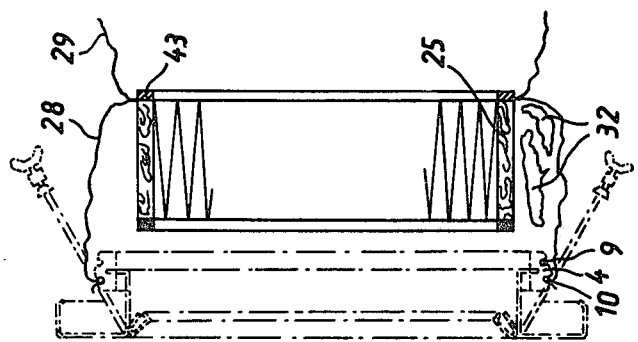
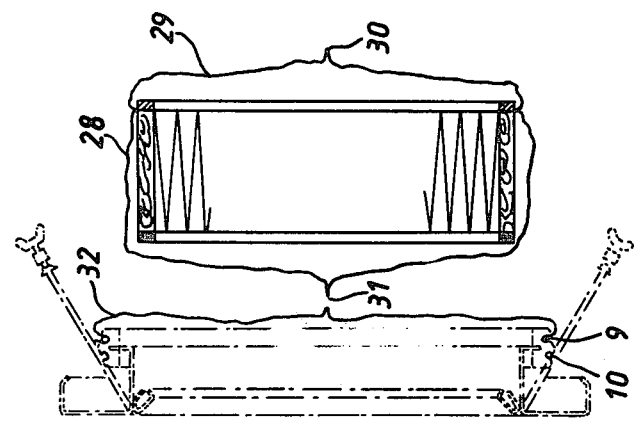
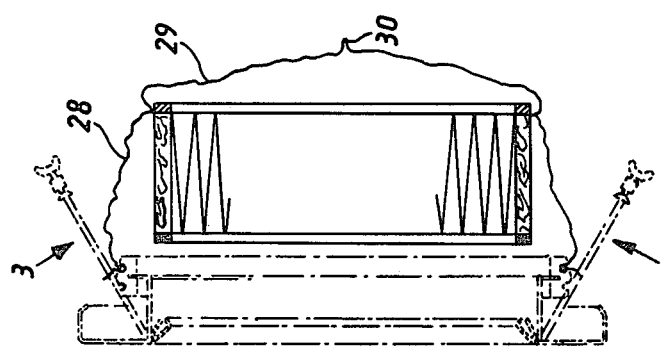
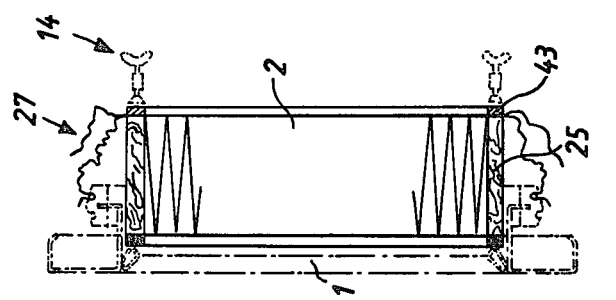

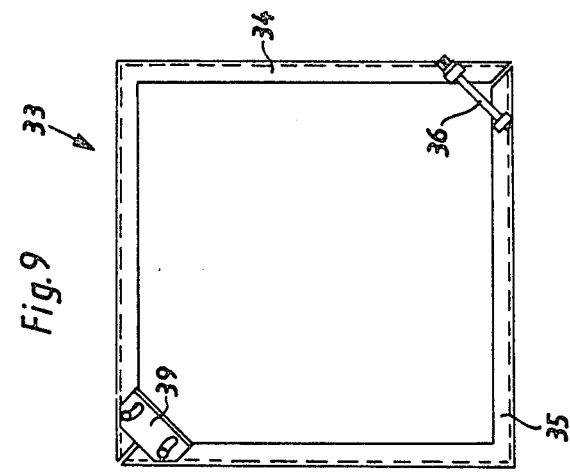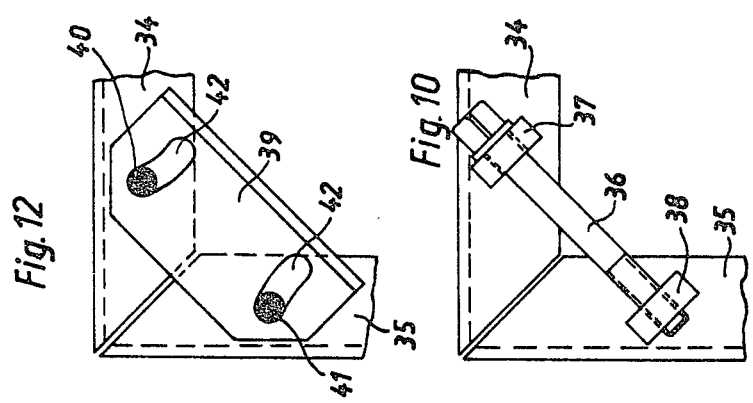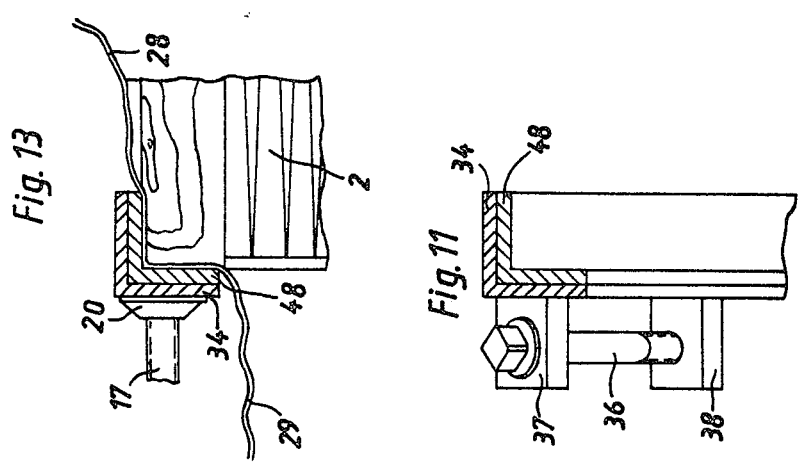

METHOD OF MOUNTING FILTER ELEMENTS AND MOUNTING THEREFOR

This is a division of application Ser. No. 725,006, filed Sept. 20, 1976, now U.S. Pat. No. 4,193,844.

BACKGROUND OF THE INVENTION

I. Field of the Invention

The invention concerns a process and a mounting frame for the insertion and exchange of filter elements for suspended matter for nuclear installations.

II. Description of the Prior Art

Today's modern nuclear installations necessitate the cleaning of increasingly larger amounts of air of radioactive contaminants and of other suspended matter, which is injurious to health. Special care has to be taken not to let any of these noxious materials escape into the atmosphere. In addition, these noxious materials should not come in contact with the maintenance personnel, in order to exclude any influence, which could be dangerous to health.

Filter elements, which are suitable for the purposes, are known. It is known to arrange such a filter element in a box-type housing, which is inserted sideways in a filter channel. The filter elements for suspended matter are inserted into the housing in a prone position through a door, which can be closed air-tight, and which is positioned in a wall of the channel. The filter elements for suspended matter are kept in place in a tight position in the housing by means of suitable tightening devices at their edge. The door opening of the housing is encircled by a ring on top of which a protective bag made of plastic is attached, in order to enable the maintenance personnel to change the radioactive contaminated filter elements without harming themselves. After the door has been opened and the tightening devices of the filter element have been loosened, the filter element is pulled into the protective bag, which is heat sealed afterwards, thus, enclosing the contaminated filter element airtight in the bag and at the same time closing the door opening with the rest of the protective bag which is also sealed off. When a new filter element is inserted, a new protective bag which contains the filter element is attached on top of the ring and slipped over the sealed-off rest of the bag of the previous filter element. This rest of the bag is then pulled into the new bag and the new filter element is inserted through the door opening into the housing. Then the tightening device is activated and the door is closed. Although these known housings offer sufficient protection for the maintenance personnel, they necessitate additional equipment, in order to separate the clean-air-side from the dusty-air-side during the changing of the filter. For this purpose flaps or gates are used, which are inserted into the housing prior to the changing of the filter in such a way that they separate the dusty-air-side from the clean-air-side. However, these separating gates are contaminated by the dusty-air-side during the changings of the filter element, because they have to contact the dust particles, which are harmful to health. These dust particles can contaminate the clean-air-side when the gates are removed from their closed position. These known housings are extremely expensive and, due to the maintenance operation, which is described above, do not offer an absolutely safe protection against contamination of the clean-air-side with radioactive material. These known housings have already been combined to form an insertable wall, which can be inserted in an opening in the wall, by arranging these housings adjacent to each other in rows, with the filters of the filter elements in their housings being arranged parallel to the stream of air. In order to pass the air through the filter layer from the dusty-air-side to the clean-air-side, between each two housings, which are located one above the other, deflecting plates for the air are installed, which lead from the upper edge of the lower housing on an incline to the opposite lower edge of the upper housing. These deflecting plates, which are arranged on both sides of the housing, form an entrance orifice for the dusty-air-side. In this way the air is forced by the deflecting plates to pass the filter layer. These known walls, which consist of housings, have the same disadvantages, since the changing of the contaminated filter elements is performed in the same way as described above. If a direct contact between the dusty-air-side and the clean-air-side must be prevented during the changing of the filter elements, it is necessary to install flaps or gates on the dusty-air-side or on the clean-air-side in front of the air entrance orifices or air exit orifices of the housings. These gates or flaps cause a relatively high additional effort and nevertheless cannot reliably prevent a contamination of the clean-air-side, for reasons which were described above, since the radioactive materials, which were possibly deposited on the gates or flaps could be transferred to the clean-air-side, when these gates or flaps are opened.

In order to avoid the large effort, which is necessary for the known housings, the filter elements for suspended matter were arranged in so-called frames, which are attached to a channel or to an opening in the brick wall. These frames consist of individual frames, which have a capacity for one filter element for suspended matter, and which are arranged adjacently above and beside each other to form a filter installation. The filter elements for suspended matter are inserted into the individual frames in an upright position. The frames consist of angle irons, which are equipped with flip-down tightening devices for the filter element for suspended matter and with a fluted frame, which permits testing for leaks, to which the filter element is clamped by means of the tightening devices in a tight position. The tightening devices are constructed in such a way that they retighten automatically, in order to guarantee a permanently leak-proof fitting of the filter element to the fluted test frame. The necessary changing of the filter elements for suspended matter necessitates a substantial effort with these frames. Since the contaminated filter elements must not be contacted with the clean-air-side for reasons which are self explanatory, the changing must be done from the dusty-air-side. This necessitates special safety measures and protective measures for the personnel who are performing these changings. The contaminated filter elements must be removed from the frame and removed from the space on the dusty-air-side by personnel equipped with appropriate protective clothing. The filter elements are removed through openings in a side wall of the room, which are equipped with air-locks. One of these openings is necessary for the removal of the contaminated filter elements, and another one is necessary for the supplying with a new filter element. The contaminated filter elements are put through the opening in the wall into a protective bag, which is mounted on a ring. The bag is heat sealed after insertion of the filter element. The performance of the changing of the filter elements from the dusty-air-side presents a substantial disadvantage and risk, due to the necessary effort, due to the eventual endangering of the maintenance personnel, and due to the transfer of the remainder of the bag in very close vicinity to the actual filter element. However, another disadvantage, which is even more substantial, consists of the fact that the dusty-air-side is in direct contact with the clean-air-side during the changing procedure by means of the orifices of the individual frames. In this way dust particles, which are harmful to health or radioactive, can get to the clean-air-side. So far one had to live with this disadvantage. This disadvantage was minimized as much as possible by performing the exchange of the contaminated filter elements for new filter elements in rapid succession. A number of persons are therefore necessary for the performance of such an exchange. In certain instances the orifices on the clean-air-side were closed by lids before the maintenance work was performed. However, the same problems with regard to contamination are encountered, as described above.

The invention is based on the objective to avoid these disadvantages, which are encountered for the known frames and housings with deflector plates, and to enable a changing of the filter elements during which the dusty-air-side and the clean-air-side are separated in the simplest way. Furthermore, the invention is based on the objective to perform the insertion and exchange of the filter elements for suspended matter from the clean-air-side, without contamination of the new protective bag and the newly exchanged filter element. This problem is solved by the process of the present invention.

SUMMARY OF THE INVENTION

The inventive process is characterized by the fact, that the insertion and exchange of the filter elements for suspended matter is performed from the clean-air-side. During the insertion of a filter element, a plastic tube (which encircles the circumference of the filter element and which exceeds in its length the layer thickness of the filter element several times) is tightly connected in its middle section with the side walls, which side walls form a border around the filter element; and then the open end of the plastic tube, which faces the frame, is connected by way of a tight fit with a ring, which is actually known and which surrounds the orifice of the frame into which the filter element is inserted. The filter element is connected with the frame by means of tightening devices, and the outer free end of the tube is turned inside out and around the filter element for the purpose of unhindered air passage through the filter layer, that during the exchange of the contaminated filter element, the outer open end of the tube is heat sealed. The filter element is disconnected and removed from the frame by flipping down of the tightening devices, and the tube is heat sealed in the section between the filter element and the frame, and, that during the insertion of a new filter element, a new tube is attached by way of tight fitting to the ring of the frame, which tube is at its middle section tightly connected with the filter element, and which tube is attached to the ring of the frame in an actually known way by overlapping of the heat-sealed tube rest. The tube rest is pulled onto the new tube and pulled off the ring, and the filter element is tightly connected with the frame by means of the tightening devices. If a contaminated filter element must be exchanged, the free end of the plastic tube is heat sealed from the clean-air-side; then the filter element is pulled off the frame by loosening the tightening device, and the tube is heat sealed and separated at the section between the filter element and the frame, in such a way that (1) the filter element is enclosed in the tube, which is heat sealed on both sides, and (2) the opening of the frame is closed by the tube rest, which is also closed by heat sealing and which is located on the ring. For the insertion of a new filter element, a new tube, which in its middle section is connected with the filter element, is attached to the ring by overlapping of the heat sealed tube rest from the previous filter element, and then the tube rest is pulled off the ring and into the new tube. The contaminated tube rest is hermetically enclosed and separated from the clean-air-side, because the new tube is at its mid-section tightly connected with the circumference of the filter element. In this way it is made sure that a contamination of the clean-air-side is impossible. The end of the tube, which extends over the filter element, is turned inside out and pulled back over the filter element in order to guarantee the unhindered passage of air through the filter layer. When the next filter exchange takes place, the sealed-off and separated tube rest, which is in the tube, is put next to the filter cell, before the tube is sealed between the filter cell and frame. In this way the contaminated filter cell and the contaminated sealed-off and separated tube rest are located in the part of the tube which was heat sealed on both sides. In this way protection of the maintenance personnel against contamination during the exchanging procedure is achieved. Furthermore it is achieved, that the dusty-air-side is separated from the clean-air-side by the heat-sealed tube rest, which is located on the ring. This advantageous effect is achieved without the use of gates or flaps, which were necessary up to now, and an immaculate freedom from contamination with regard to the clean-air-side and with regard to the maintenance personnel is achieved as well. This cannot be achieved with the known types of equipment.

The frame, which is used for the performance of the process, is characterized by the fact that it consists of an angle-iron, which is shaped like the letter C. Its outer leg, which is located parallel to the direction of flow, is equipped with openings, which serve to connect it with adjacent frames. To the inner circumferential edge of its other leg, which is located perpendicular to the direction of flow, a fluted test frame is attached, which is directed inward and conically tapered, and which serves to receive the gasket. Its inner leg, which is located parallel to the direction of flow, forms a rectangular or square opening to receive the filter element. Its other leg, which is bent outward forms a concave curve with its edge which touches the corners of the opening of the frame and is closed in itself, and to which an actually known flexible ring is attached, which is equipped with two grooves.

The frame, which is a building element for the wall, is characterized by the small effort which is necessary for its production. It is built from angle irons, which are identical to each other, if the frame is a square. The fork at the angle iron, which receives the ring, runs outwards from the ends of the angle iron, which form the corners of the receiving opening for the filter element in the form of a concave arch. In this way an edge is formed in the form of a curve that is closed in itself. The frame is formed by the angle irons that are welded together. The edge, which is thus formed, serves to receive the ring; but the ring does not hinder the operation of the tightening devices for the filter cell, and a proper test for leaks can be performed from the service side on the filter element, which was inserted in the frame. During the performance of the exchange of the filter element, the maintenance personnel is reliably protected against contamination by radioactive materials and does not come in contact with the dusty-air-side. In addition the dusty-air-side is separated from the clean-air-side hermetically during the performance of the filter exchange. In this way the combined effect of the frame and the plastic tube offers a distinct advantage over the comparable known types of walls and frames considering the simple way of its production and installation, as well as its great maintenance possibilities with a minimum of necessary effort, which did not seem to be attainable before.

Other objects, advantages and applications of the present invention will become apparent to those skilled in the art of filters when the accompanying description of one example of the best mode contemplated for practicing the present invention is read in conjunction with the accompanying drawings.

BRIEF DESCRIPTION OF THE DRAWINGS

The description herein refers to the accompanying drawings wherein the like referenced numerals refer to like components throughout the several views, and wherein:

FIG. 2 is a frontal view of a wall having a frame of the type shown in FIG. 1;

FIG. 3 is a cross-sectional side elevational view of FIG. 2;

FIGS. 7a to 7d are schematic views of the exchange procedure for the filter element;

FIG. 9 is a top view of the angle iron frame which serves to connect the plastic tube with the filter element;

FIG. 10 is a partial drawing in accordance with FIG. 9 on an enlarged scale;

FIG. 11 is a side view in accordance with FIG. 10 in cross-section;

FIG. 12 is a drawing in accordance with FIG. 10 showing a modified type of frame;

FIG. 13 is a side view in cross-section in accordance with FIG. 12; and

DESCRIPTION OF THE PREFERRED EMBODIMENTS

Figure 1:
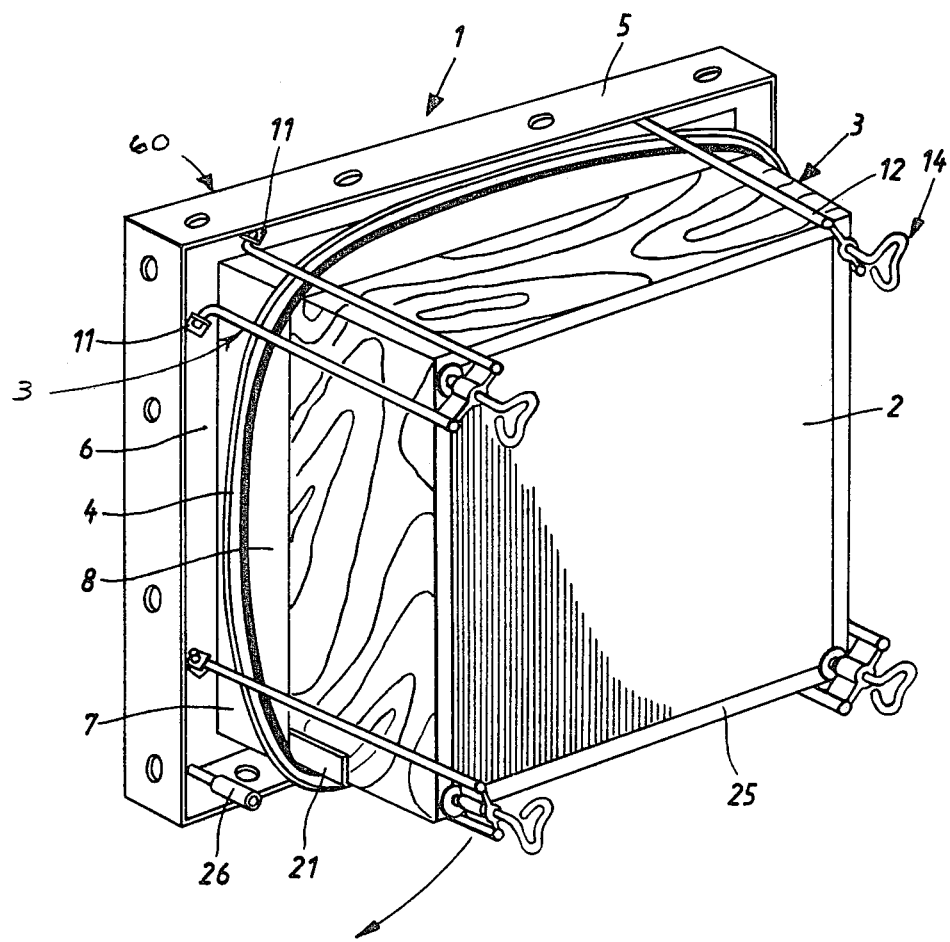
FIG. 1 is a perspective view of one example of the present invention in the form of a frame with a filter inserted therein.
Figure 4:
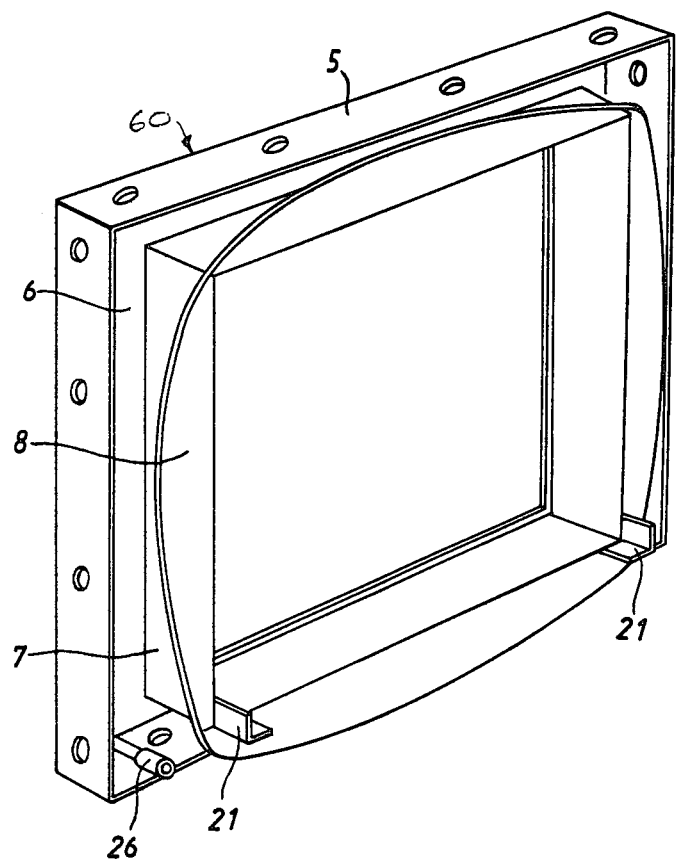
FIG. 4 is a perspective view of a frame without a filter element.
Figure 5:
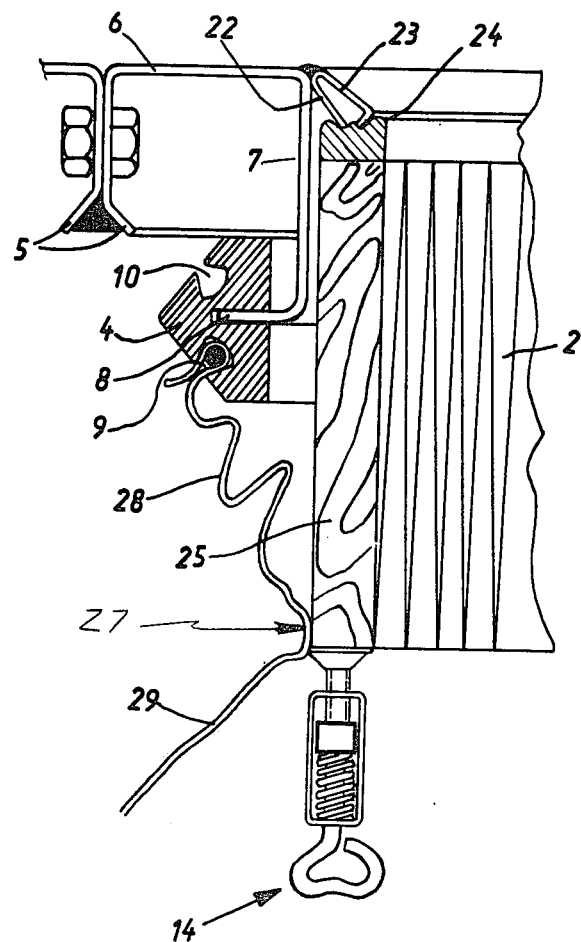
FIG. 5 is an enlarged cross-sectional partial drawing in accordance with FIG. 3.

FIGS. 1 to 4 show the frame 1 that is assembled with angle irons 60, which in cross-section look like the letter C. This can be seen and recognized especially in FIGS. 3 and 4. The leg 5 of each angle iron 60 is located outside and parallel to the direction of flow and is equipped with holes, in order that a plurality of frames 1 can be arranged side by side and one on top of the other, as shown in FIG. 2. The legs 5 of adjacent frames are bolted together, and the gaps which are formed between the legs 5 of adjacent frames are sealed, so that a gas-tight connection of the frames 1 is guaranteed. The leg 6, which is located next to leg 5 and is located perpendicularly to the direction of flow, is equipped at its inner edge on actually known fluted test frame 22, as shown in FIGS. 3 and 5. This test frame extends conically inside and is attached to gasket 24 by means of its test groove. Gasket 24 is located on the front parts of the side walls 25 of filter element 2. Area 23, which is located inside the fluted test frame 22, forms a dust deflecting area 23, which leads in at an angle into the filter element 2 for the air which streams towards the filter element 2 from the dusty-air-side. In this way radioactive materials cannot be deposited on area 23, but they will be deposited in the filter layer. The fluted test frame 22 is connected with the test air by means of air connector 26, which is located inside the frame 1 at the clean-air-side. This is shown in FIG. 1. In this way an unhindered test for leaks from the clean-air-side is guaranteed. The inner leg 7 of the angle irons, which is located parallel to the direction of flow, as shown in FIG. 1 and FIG. 4, forms the opening for the insertion of filter element 2. At the lower corners of this opening protruding support brackets are attached, which support the filter element 2. The leg 7 of the angle iron of the frame 1 is equipped with a lip 8, which is located perpendicular to the direction of flow and originates at the ends of the angle iron 60, which form the corners of the opening for insertion. The lip 8 extends in a concave manner between the ends in a way that an edge is formed, which is a closed curve and on which a ring 4 of elastic material, such as rubber, is located, as shown in FIGS. 1 through 3. The ring 4 possesses two circumferential grooves 9 and 10, which are located one behind the other when viewed in the direction of flow and which serve to receive the plastic tube 27, as will be described below.

Figure 6:
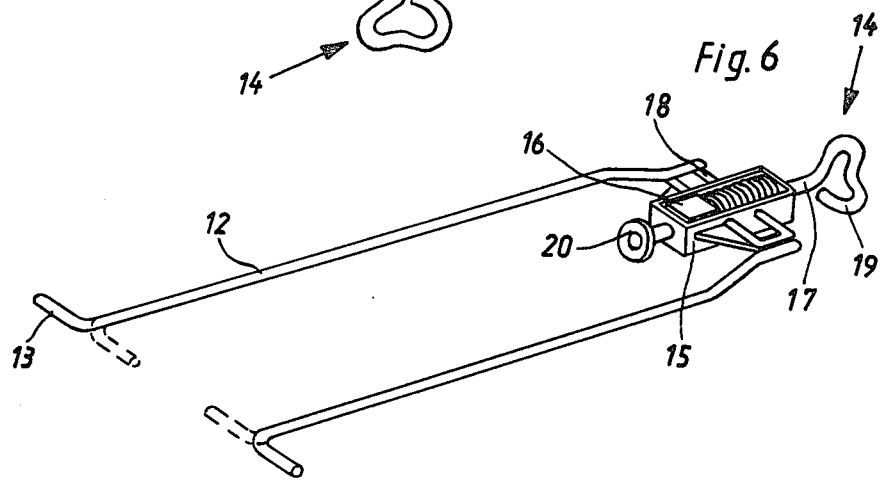
FIG. 6 is a perspective view of a tightening device.

As shown in FIG. 1, two angle irons 11 are attached to each corner of the frame on on the inner side of the leg 6 and serve as support for the tightening devices 3. These tightening devices are mounted diagonally with reference to frame 1 and can be swung down towards the outside. The tightening device 3, which is shown in detail in FIG. 6, consists of a U-shaped frame 12. The free ends 13 of this U-shaped frame 12 are bent outside or inside and snap onto the drilled holes of the angle irons 11. At the other end of the frame 12 a tightening device 14 is attached, which is actually known and which consists of a box frame 15, which is attached to the frame 12 and in which a rectangular nut 16 is supported by a pressure spring 18. A threaded bolt 17 is passed through the spring 18 and the rectangular nut 16. The threaded bolt 17 is equipped with a handle 19 at its outer end, and it is furthermore equipped with a disc 20 at its inner end. As shown in FIG. 1, the disc 20 of the tightening device 14 is supported by one corner of the frame of the filter element 2, which is formed by the side walls 25. By means of tightening of the threaded bolt 17, the circumferential gasket 24 of the filter element 2 is brought in tight contact with the fluted test frame 22. The pressure spring 18 supplies an additional elastic pressure in order to prevent leaks between filter element 2 and fluted test frame 22. If the filter elememt 2 should be removed from the frame 1, the tightening devices 14 are loosened and the tightening device 3 is flipped down outside without any hindrance by ring 4.

The tube 27 is open on both ends and is connected at its middle section with the side walls 25 of filter element 2, as shown in FIG. 5, prior to the insertion of a filter element 2 in the frame 1. In this way the tube 27 forms a frontal section 28, which faces the ring 4 and a rear section 29, which protrudes backwards behind the filter element 2. Before the filter element 2 is attached to the frame 1 by means of the tightening device 3, the front tube section 28 is clamped down into the ring groove 9 of the ring 4, as shown in FIG. 5, employing an elastic tightening ring. The other tube section 29 is turned inside out and back towards the filter element 2 in order to guarantee a free passage of air through the filter layer of the filter element 2.

FIGS. 7a through 7d show the exchange process for a filter element 2. FIG. 7a equals FIG. 5, except that the connection of the mid-section of the tube 27 is done by means of a frame ledge 43, which is tightly connected with the side walls 25 of the filter element by means of welding. In this way the tube 27 is at its middle section tightly connected with the filter element 2. If the filter element 2 should be exchanged, the tube section 29 is heat sealed at 30 above the back of the filter element 2. Then the tightening devices 14 are loosened, as shown in FIG. 7b, so that the tightening device 3 can be swung around to the outside and the filter element 2 can be pulled out of the frame 1. Then the tube section 28 is also heat sealed at 31, as shown in FIG. 7c. The filter element 2 is now located in a closed protective bag, which was formed by heat sealing at 30 and 31. This bag with the filter sealed inside can now be discarded. The frame 1 is closed by the tube rest 32, which was formed from tube section 28, so that the dusty-air-side is separated from the clean-air-side until the tube rest 32 is removed. After removal of the contaminated filter element 2, which is enclosed in the heat-sealed tube section, a new filter element 2 is inserted in the opening of frame 1. This is shown in FIG. 7d. The filter element 2 is equipped with a tube 28, 29 and is connected with this tube at the middle section of the tube. The tube section 28 is squeezed into the groove 10 of ring 4, over the heat-sealed tube rest 32. Then the tube rest 32 is pulled off the ring 4 and into the inside of tube section 28. The tube rest 32 is then placed next to the new filter element 2. Then the tightening devices 3 are placed over the corners of the filter element 2, and the tube section 29 is turned inside out and pulled over the filter element 2. In this way the contaminated filter element 2 is exchanged for a new filter element 2, without endangering the maintenance personnel with contamination, who works at the clean-air-side. In addition, the dusty-air-side cannot come in contact with the clean-air-side, since the sealed-off tube rest 32 hermetically seals the opening of frame 1 for the duration of the entire exchange procedure.

Figure 8C:
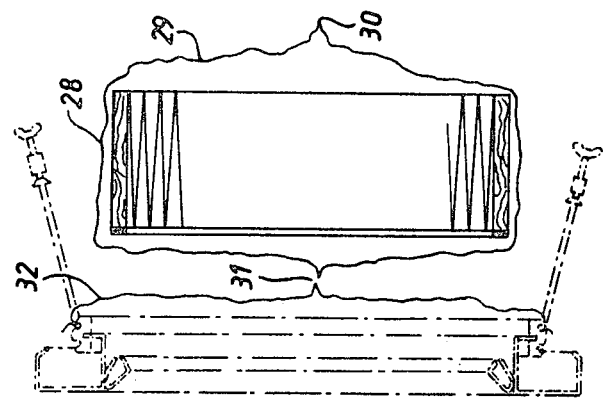
FIGS. 8a to 8c are schematic views similar to FIG. 7, but for a different type of mounting arrangement.
Figure 8B:
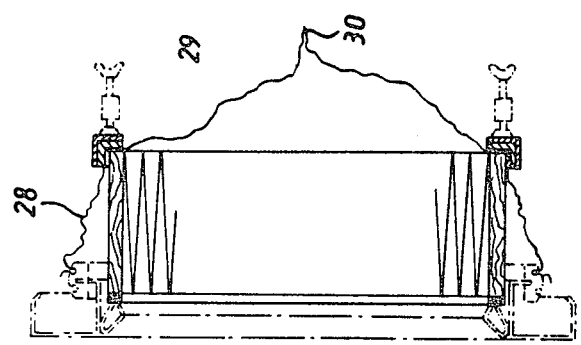
Figure 8A:
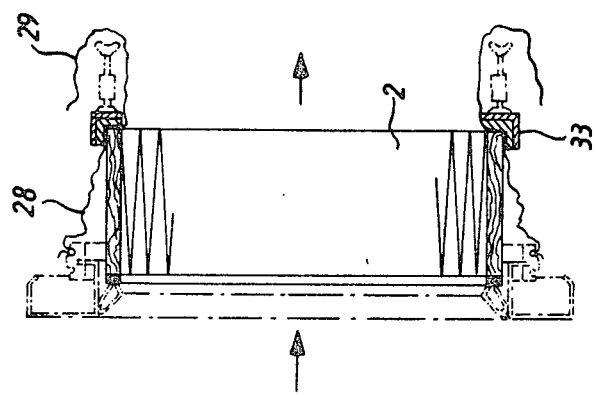

FIGS. 8a through 8c corresponds to FIGS. 7a through 7c, except for the fact that the tube 27 is attached at its mid-section to the filter element 2 by means of an angle iron frame 33, which is supported by the side walls 25 of the filter element 2 and which squeezes together tube 27 and filter element 2. FIGS. 9 through 13 show the angle iron frame 33, which is split diagonally at the corners, as shown in FIG. 9, and which consists of two rectangular parts 34 and 35. FIGS. 10 and 11 show a latch, which tightly connects the frame parts 34 and 35. The latch consists of a tightening bolt 36, which is passed through a leg of the frame part 34, which is located perpendicular to the direction of flow at the corner area at panel 37, and which threads into panel 38. Panel 38 is attached to the corresponding leg of frame part 35. In this way both the frame parts 34 and 35 are pulled tightly together, when tightening bolt 36 is turned, and in this way frame parts 34 and 35 connect tube 27 by means of an elastic gasket 48 gas-tight with the filter element 2. The FIGS. 12 and 13 show a modified version of the tightening latch. It consists of a tightening panel 39, which is supported by the corner area of the legs of the frame parts 34 and 35, which are located perpendicular to the direction of flow. On the legs of the frame parts 34 and 35 pins 40 and 41 are attached, which engage into the slots 42 of the tightening panel 39. The direction of the slots 42 turns toward the slots in their upper area, whereas the slots run parallel to each other in their lower area. If in accordance with FIG. 12 the tightening panel 39 is pushed towards the corner, which is formed by the two frame parts 34 and 35, the frame parts 34 and 35 are moved towards each other by means of the pins 40 and 41 and by means of the slots 42. In this way the tube is squeezed gas-tight between the side walls 25 of the filter element 2 and the frame parts 34 and 35.

Figure 14A:
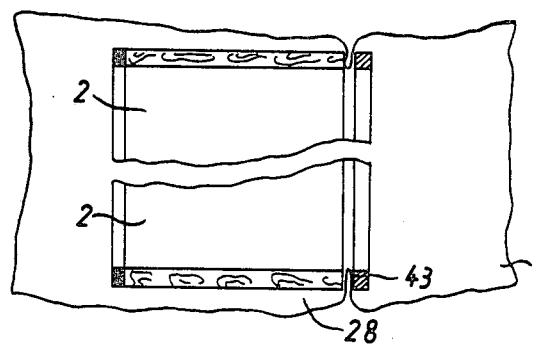
FIGS. 14a to 14d are schematic views of different ways of connecting the plastic tube with the filter element.
Figure 14B:
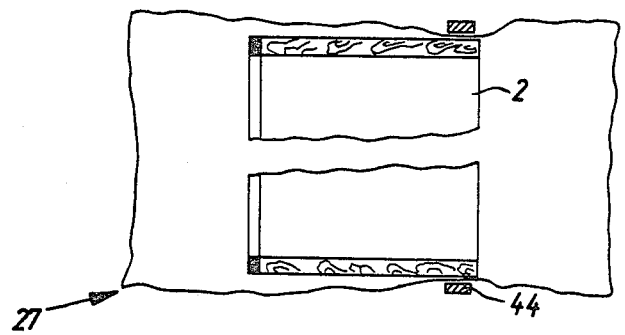
Figure 14C:
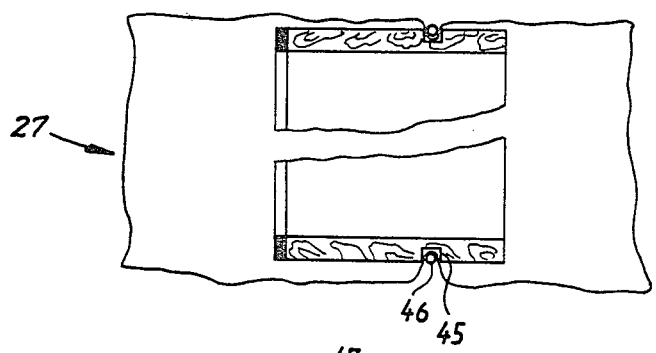
Figure 14D:
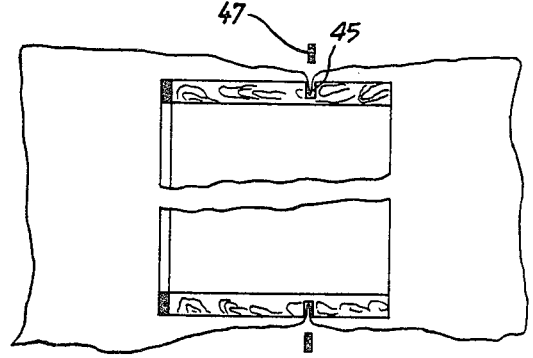

The FIGS. 14a through 14d show various other possibilities of a mid-sectional connection of the tube 27 with the filter element 2. FIG. 14a shows like FIG. 7a frame ledge 43, which is nailed to filter element 2 after the tube 27 has been put between frame ledge 43 and tube 27. FIG. 14b shows an elastic tightening ring 44, which is put on the side walls 25 of the filter element 2, and which squeezes the tube 27 in its mid-section to the circumference of the filter element 2. The FIGS. 14c and 14d show a circumferential groove 45, which is located in the side walls 25 of the filter element 2. An elastic tightening ring (46 or 47) is inserted into this groove and over the tube 27. This elastic tightening ring can either be of circular cross-section (46) or of rectangular cross-section (47).

While several examples of applicants' invention have been disclosed, it should be understood by those skilled in the art of filters that other forms of applicants' invention may be had, all coming within the spirit of applicants' invention and the scope of the appended claims.

What is claimed is as follows:

1. Process for the insertion and exchange of filter elements for suspended matter for nuclear installations, where the filter elements having side walls are tightly enclosed in a frame by tightening devices, which can be swung down, which frame consists of frame parts, which are made of angle iron and which frame parts are tightly connected in rows next to each other and one above each other, and which frame is located in an opening in the brick wall, characterized by the fact, that the insertion and the exchange of the filter elements for suspended matter is performed from the clean air side, that during the insertion of the filter element a tube of plastic material, which encircles the circumference of the filter element, and which tube exceeds many times in its length the layer thickness of the filter element, is at its middle section tightly connected with the side walls, which form the border of the filter element, and then the open tube end which faces the frame is by squeezing tightly connected with a ring which surrounds the opening of the frame, the ring having first and second circumferential grooves spaced one behind the other when viewed in the direction of flow which frame serves to receive the filter element comprising the steps of:

swinging the tightening devices away from the filter;
pulling the outer free end of the tube over the filter;

heat sealing the outer free end of the tube;

loosening and pulling the filter away from the frame;

heat sealing the tube between the filter element and the frame;

installing a new filter element and tube by squeezing the new tube to the first groove overlapping a remaining portion of the old tube, in the second groove the middle portion of the new tube squeezed to the new filter element;

releasing the remaining portions of the old tube from the second groove and pulling the remaining portion into the new tube;

connecting the new filter tightly to the frame using the tightening device;

releasing the new tube from the first groove and reinstalling the new tube in the second grove.

* * * * *